United States Patent [19]
Jang

[11] Patent Number: 5,941,794
[45] Date of Patent: Aug. 24, 1999

[54] FAIL SAFE VALVE FOR AUTOMATIC POWER TRANSMISSIONS

[75] Inventor: Jeaduck Jang, Kyungki-do, Rep. of Korea

[73] Assignee: Hyundai Motor Company, Seoul, Rep. of Korea

[21] Appl. No.: 08/950,591

[22] Filed: Oct. 15, 1997

[30] Foreign Application Priority Data

Oct. 15, 1996 [KR] Rep. of Korea ...................... 96-45879

[51] Int. Cl.$^6$ .................................................. F16H 61/26
[52] U.S. Cl. ........................................... 477/143; 477/906
[58] Field of Search ................................... 477/143, 144, 477/145, 131, 130, 906

[56] References Cited

U.S. PATENT DOCUMENTS

| | | |
|---|---|---|
| 4,903,551 | 2/1990 | Hiramatsu et al. . |
| 5,536,216 | 7/1996 | Jang . |
| 5,611,749 | 3/1997 | Jang et al. . |
| 5,662,550 | 9/1997 | Jang . |

FOREIGN PATENT DOCUMENTS

| | | |
|---|---|---|
| 06935662 | 1/1995 | European Pat. Off. . |
| 0691487 | 1/1996 | European Pat. Off. . |
| 0770801 | 5/1997 | European Pat. Off. . |
| 3836421 | 5/1989 | Germany . |

*Primary Examiner*—Khoi Q. Ta

[57] ABSTRACT

A hydraulic control system for an automatic transmission, including a hydraulic pressure source, a hydrualic pressure regulator, a transmission mode selector, a shifting controller for automatically controlling shifting between transmission speeds in a given transmission mode, and a hydrualic pressure control mechanism for controlling quality and responsiveness of the shifting between transmission speeds. The hydrualic control system includes a fail safe valve for assuredly maintaining a certain transmission speed (such as third speed) when a transmission control unit (TCU) fails, or when a valve in the control system sticks or becomes inoperative.

17 Claims, 14 Drawing Sheets

FAIL SAFE VALVE FOR AUTOMATIC POWER TRANSMISSIONS

FIELD OF THE INVENTION

The present invention relates to a hydraulic control system for controlling automatic power transmissions, especially power transmissions used in vehicles.

DESCRIPTION OF RELATED ART

Generally, a conventional automatic transmission for a vehicle includes a torque convertor, and a multi-stage gear shift mechanism. The transmission also includes a plurality of friction elements which are actuated by hydraulic pressure and which, in various combinations of actuation, select a gear stage (i.e., a "speed") of the gear shift mechanism, according to a driving state of a vehicle.

A conventional hydraulic control system for controlling automatic transmissions used in vehicles operates by selecting friction elements using hydraulic pressure created in a hydraulic pump, such as an oil pump. The hydraulic pressure passes through a shift control valve. As a result, shifting of transmission speeds appropriate to the driving state of the vehicle can be automatically realized.

The above-described hydraulic control system includes a pressure regulator which regulates hydraulic pressure created in a hydraulic pump; manual and automatic shift controllers which are able to select a transmission mode and control shifting between transmission speeds; a hydraulic pressure controller which controls shift quality and shift response for smoothly shifting between transmission speeds during shifting; a damper clutch controller for operating a torque convertor damper clutch; and a hydraulic pressure distributor which selectively supplies amount of hydraulic pressure to each of the friction elements.

In the conventional hydraulic control system, hydraulic pressure distribution by the hydraulic pressure distributor is controlled by controlling ON/OFF states and duty rates of solenoid valves by a transmission control unit. Accordingly, friction elements are selectively engaged and released, thereby realizing the control of transmission speed shifting.

However, when shifting between transmission speeds in the above-described conventional hydraulic control system, the timing required to release the hydraulic pressure operating on a current friction element and to supply hydraulic pressure on a new friction element greatly influences shift quality. Also, in the conventional hydraulic control system, engine rpm can suddenly increase as the shift mechanism becomes interlocked and the engine briefly falls into a neutral state.

To improve shift quality by controlling the timing of supplying hydraulic pressure, the conventional control system focuses on the structure of the shift valves. However, this complicates the shift valve structure.

SUMMARY OF THE PRESENT INVENTION

The present invention has been made to solve the foregoing problems.

It is an object of the present invention to provide a hydraulic control system for controlling an automatic transmission which facilitates shift control by permitting independent control of friction elements when kick-down skip shifting from a fourth speed to a second speed, when manually shifting from neutral to drive, and, after skip shifting from the fourth speed to the second speed, prevents a reduction of friction element pressure. Also, the present invention prevents sticking in a fail-safe valve by enabling the movement of a valve spool in a first speed.

To achieve the above-mentioned object, the present invention provides a hydraulic control system which includes a pressure regulator which regulates hydraulic pressure produced in an oil pump; manual and automatic shift controllers which select a transmission mode and control shifting between transmission speeds; a hydraulic pressure controller which controls shift quality and responsiveness for smoothly selecting shift modes during shifting; a damper clutch controller for operating a damper clutch of a torque convertor; and a hydraulic pressure distributor which supplies and distributes hydraulic pressure to, for example, first, second, third, fourth, and fifth friction elements, which operate as input and reactive force elements in each shift stage. The hydraulic pressure distributor comprises:

a 1-2 shift valve, controlled by a second speed pressure of a shift control valve of the automatic shift control means and which has lines for supplying hydraulic pressure, passing through a first pressure control valve, to at least one friction element (excluding the first friction element) in all shift modes except in the first speed of a drive "D" range;

a 2-3/4-3 shift valve, controlled by third and fourth speed pressure, having formed lines which, in a third speed of the drive "D" range, allow the supply of hydraulic pressure received from the 1-2 shift valve to the fourth friction element and a release side chamber of the second friction element, and in a reverse shift stage, allow the supply of hydraulic pressure received from a reverse first control line to the above friction elements;

a control switch valve, controlled by first speed pressure which, in turn, is controlled by a solenoid valve mounted to a timing control line, the control switch valve selectively supplies second speed pressure, third speed pressure, and hydraulic pressure supplied from the 1-2 shift valve to an operational side chamber of the second friction element, operating in the second, third, and fourth speeds of the drive "D" range, and to the third friction element, operating in the third and fourth speeds;

a high-low pressure valve, controlled by the solenoid valve controlling the control switch valve, which, when third and fourth speed shifting is completed in the drive "D" range, supplies hydraulic pressure to a pressure regulating valve of the pressure regulating means and allows line pressure change;

a rear clutch release valve, controlled by fourth speed line pressure, which supplies hydraulic pressure received from a second pressure control valve to the first friction element and, at the same time, in the reverse shift stage, supplies hydraulic pressure supplied to the reverse first control line and hydraulic pressure supplied from a reverse pressure line to the fourth friction element and the release side chamber of the second friction element; and a fail-safe valve, which holds the transmission in third speed when the TCU is not operating or when sticking occurs in shift valves.

According to a feature of the present invention, part of the first speed pressure supplied to the 1-2 shift valve from the shift control valves of the automatic and manual shift control means is supplied to the operational side chamber of the second friction element, operating in the second, third, and fourth speeds of the drive "D" range, through the control switch valve and the fail-save valve, while another part of the first speed pressure is made to operate as control pressure of the fail-safe valve.

According to another feature of the present invention, the fourth speed pressure, supplied as rear clutch release valve control pressure from the shift control valves of the automatic and manual control means, is supplied to a right side of the 2-3/4-3 shift valve, and it operates as control pressure for the 2-3/4-3 shift valve together with the third speed pressure.

According to still another feature of the present invention, the solenoid valve controlling the control switch valve and the high-low pressure valve is mounted on a first speed line and on the timing control line, connected to the above valves.

According to still yet another feature of the present invention, the 2-3/4-3 shift valve is formed such that it simultaneously supplies hydraulic pressure received from the 1-2 shift valve and the rear clutch release valve to the release side chamber of the second friction element and the fourth friction element.

According to still yet another feature of the present invention, a valve spool of the fail-safe valve operates by the hydraulic pressure supplied to the first friction element in the first speed.

The 1-2 shift valve includes a first port which receives second speed pressure from the shift control valve in the forward-moving 2, 3, 4 speed shift stages; a second port which receives hydraulic pressure from the first pressure control valve; a third port receiving reverse pressure from the manual transmission mode selector in a reverse shift stage; a fourth port receiving control pressure from the first pressure control valve, through the 2-3/4-3 shift valve and the control switch valve; and a fifth port receiving the control pressure and reverse pressure through the fifth friction element.

The above 2-3/4-3 shift valve includes a first port connected to a shift control valve of the automatic shift controller; a second port connected to the rear clutch release valve; a third port connected with the 1-2 shift valve; a fourth port connected to at least one of the rear clutch release valve and the reverse first control line; and a sixth port communicating with and supplying hydraulic pressure to the release side chamber of the second friction element and the fourth friction element.

The control switch valve includes a first port which receives control pressure from the timing control line connected to the first speed line; a second port which receives both control pressure of the first pressure control valve passing through the 1-2 shift valve, and hydraulic pressure from the second third speed lines of the shift control valve; and a third port which selectively supplies hydraulic pressure received from the first and second ports to the fail-safe valve and the third friction element. The first port receiving hydraulic pressure from the first speed line is structured such that it is controlled by the fifth solenoid valve.

The high-low pressure valve includes a first port communicating with the manual transmission mode selector; a second port communicating with the shift control valve of the automatic shift controller; and a third port supplying third speed hydraulic pressure to the pressure regulator valve.

The rear clutch release valve includes a first port which receives hydraulic pressure from the shift control valve and supplies this to the 2-3/4-3 shift valve; a second port communicating with the second pressure control valve; third and fourth ports communicating with the reverse first control line and two ports, one of which connects this port to the 2-3/4-3 shift valve; and a port, which supplies the hydraulic pressure supplied to the second pressure control valve to the first friction element.

The fail-safe valve includes first and second ports receiving hydraulic pressure from the control switch valve; a third port connected with the second speed line of the shift control valve; a fourth port which receives part of the hydraulic pressure supplied to the first friction member; a fifth port receiving part of the hydraulic pressure supplied to the release side chamber of the second friction element and to the fourth friction element; and a sixth port supplying the hydraulic pressure supplied to the control switch valve to the operational side chamber of the second friction element.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENT

Preferred embodiments of the present invention will now be described in detail with reference to the accompanying drawings.

Figure 1:
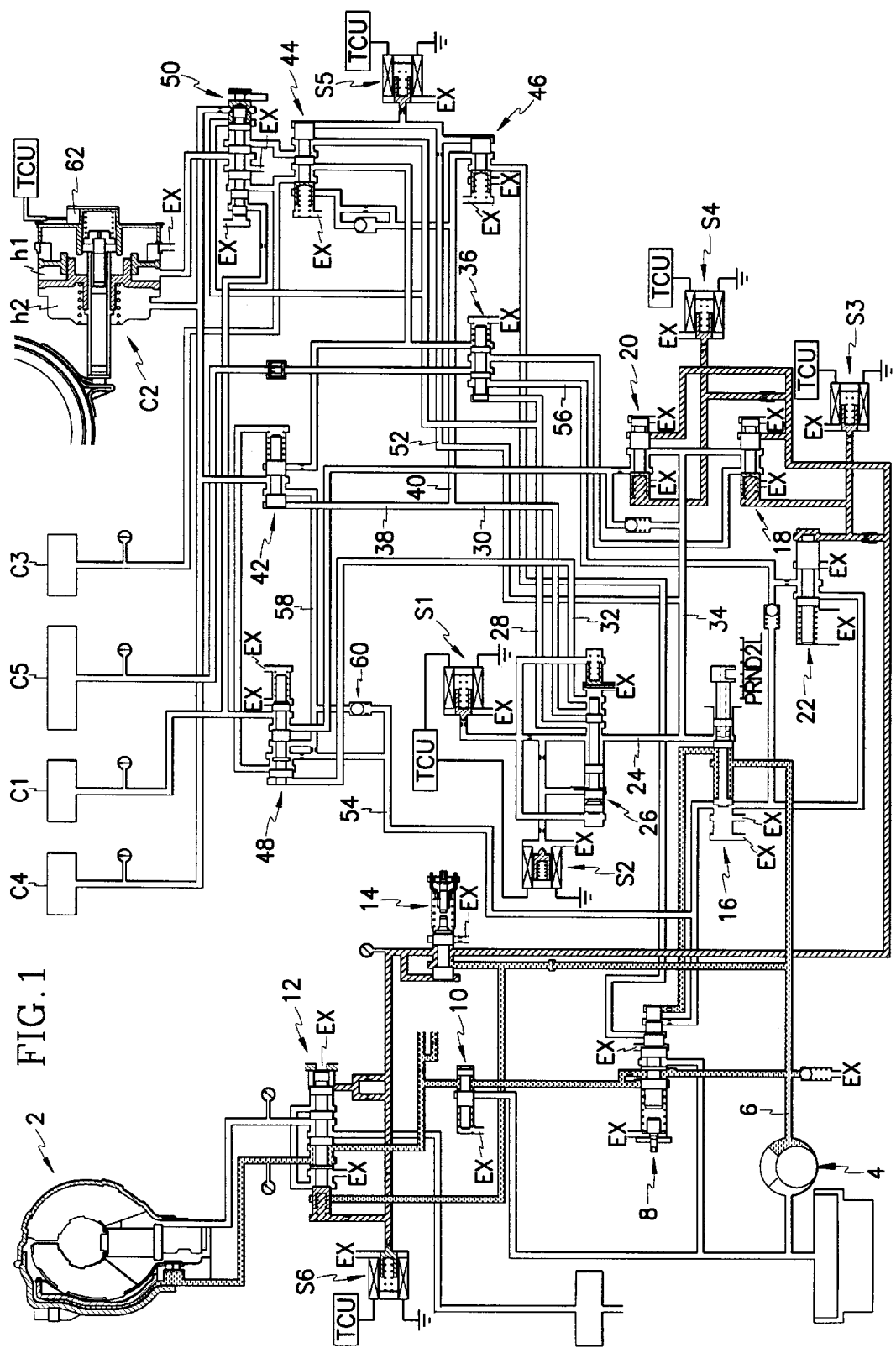
FIG. 1 is a view illustrating a hydraulic pressure flow state in a neutral "N" range of a hydraulic control system of the present invention.

FIG. 1 shows a hydraulic control system according to the present invention when a shift lever is in a neutral "N" range.

The hydraulic control system includes a torque convertor 2, which receives power from an engine and converts and transmits this power, and an oil pump 4, which creates and discharges oil pressure needed for the torque convertor 2, the control of transmission speed shifting, and for lubrication.

An hydraulic pressure regulator valve 8, which keeps the hydraulic pressure created in the oil pump 4 constant, a torque convertor control valve 10, which keeps the pressure of oil at a fixed level for the torque convertor 2 and for lubrication, and a damper clutch control valve 12 for increasing power transmission efficiency of the torque convertor 2, are all connected on a line 6, through which oil pressure created in the oil pump 4 flows, collectively operating as a pressure regulator and damper clutch controller.

The line 6 is structured such that part of the oil pressure produced in the oil pump 4 is supplied to a reducing valve 14, which continuously maintains hydraulic pressure at a level lower than the line pressure. Another part of the oil pressure is supplied to a manual valve 16, which changes the lines through which hydraulic pressure passes by operating according to a position of the shift lever located in the driver's compartment.

Also, a hydraulic pressure controller is provided and structured such that hydraulic pressure, reduced by the reducing valve 14, is supplied to a first pressure control valve 18 and a second pressure control valve 20. This pressure is used to control the shift stages.

In addition, lines are formed that are used by control pressure of N-R control valve 22, which reduces shift shock, when part of the hydraulic pressure supplied to the first and second pressure control valves 18 and 20 changes modes from a neutral "N" range to a reverse "R" range.

The manual valve 16 and the manual and automatic shift controllers are connected to a line 24, through which hydraulic pressure flows, and communicate with a shift control valve 26. The shift control valve 26 changes the lines that the hydraulic pressure acts on according to the operation of first solenoid valve (S1) and second solenoid valve (S2).

Second speed line 28, third speed line 30 and fourth speed line 32 are connected to shift control valve 26 to enable the control pressure to shift valves of the hydraulic pressure distributor to control each of the shift stages.

Further, first speed line 34 is connected to the line 24 to convey the line pressure from the first and second pressure control valves 18 and 20. The first and second pressure control valves 18 and 20 allow line conversion by the third and fourth solenoid valves (S3) and (S4). The first pressure control valve 18 allows control pressure to be supplied to friction members when shifting, and the second pressure control valve 20 enables drive pressure to be supplied to a first friction member (C1), operating by a pressure member of a first speed.

The second speed line 28 of the shift control valve 26 is connected to a left-side port of a 1-2 shift valve 36 and controls the same, and through a separate line, it supplies operational pressure to an operational side chamber (h1) of a second friction element (C2).

The third speed line 30 is divided into two separate branch lines 38 and 40. The first branch line 38 is connected to a left-side port of a 2-3/4-3 shift valve 42 and controls the same. The second branch line 40 is further divided, with one division connected to a control switch valve 44 such that hydraulic pressure is supplied to a third friction element (C3). The other division of line 40 is connected to a high-low pressure valve 46 such that hydraulic pressure is supplied to the pressure regulator valve 8 of the pressure regulator.

The fourth speed line 32 communicates with a left side port of a rear clutch release valve 48, through which it communicates with a right side of the 2-3/4-3 shift valve 42. The fourth speed line 32 controls the aforementioned two valves 48 and 42.

Also, a fail-safe valve 50 is mounted between part of the valves of the hydraulic pressure distributor and at least two of the friction members. The fail-safe valve 50 performs fail-safe functions to an ideal shift stage when transmission control unit (TCU) is not operating or when sticking occurs in the valves which comprise the hydraulic pressure distributor.

In addition, a timing control line 52 is connected to the manual valve 16, and first speed pressure, flowing through this line, can be used as control pressure by the control switch valve 44. The flow of the first speed pressure is controlled by a fifth solenoid valve (S5) mounted on the timing control line 52.

Further, when the manual valve 16 is in the reverse "R" range, hydraulic pressure supplied to a reverse first control line 54 can be supplied to a fourth friction element (C4) through the rear clutch release valve 48 and the 2-3/4-3 shift valve 42. At the same time, hydraulic pressure supplied to a reverse second control line 56 is supplied to a fifth friction member (C5), operating as a reactive force element in the reverse shift stage, by passing through the 1-2 shift valve 36.

In the above, part of the hydraulic pressure supplied to the fourth friction member (C4) is simultaneously supplied to a release side chamber (h2) of the second friction member (C2).

With regard to the valves forming the hydraulic pressure distributor, the 1-2 shift valve 36 is controlled by second speed pressure of the shift control valve 26. The hydraulic pressure supplied from the first pressure control valve 18 passes through the 2-3/4-3 shift valve 42 and is supplied as control pressure to the release side chamber (h2) of the second friction member (C2), the fourth friction member (C4) and a right side end of the fail-safe valve 50. At the same time, hydraulic pressure is supplied to the third friction element (C3) through the control switch valve 44, or to the second friction element (C2) through the fail-safe valve 50.

Also, the lines are formed so that hydraulic pressure in the reverse second control line 56 can be supplied to the fifth friction element (C5).

The above 1-2 shift valve 36 is realized through a first port, which receives second speed pressure from the shift control valve 26 in forward-moving second, third, and fourth speed shift stages; a second port, which receives hydraulic pressure from the first pressure control valve 18 of the hydraulic pressure controller; a third port, receiving reverse pressure from the manual valve 16 in the reverse shift stage; a fourth port, which receives control pressure, supplied from the first pressure control valve 18, through the 2-3/4-3 shift valve 42 and the control switch valve 44; and a fifth port, receiving said control pressure and reverse pressure through the fifth friction element (C5).

Further, the 2-3/4-3 shift valve 42 is controlled by the third and fourth speed pressure supplied to the left and right sides thereof in the third and fourth shift stages. The 2-3/4-3 shift valve 42 selectively supplies hydraulic pressure supplied from the 1-2 shift valve 36, and from the rear clutch release valve 48 in the reverse shift stage, to the release side chamber (h2) of the second friction element (C2) and the fourth friction element (C4).

The 2-3/4-3 shift valve 42 includes a left-side first port, connected to the third speed line 30; a right-side second port, connected to the fourth speed line 32 through the rear clutch release valve 48; a third port, which receives hydraulic pressure by being connected with the 1-2 shift valve 36; a fourth port, connected to the rear clutch release valve 48 or communicating with the reverse first control line 54; and a fifth port, communicating with and supplying hydraulic pressure to the release side chamber (h2) of the second friction element (C2) and the fourth friction element (C4).

The control switch valve 44 supplies part of the hydraulic pressure supplied to the first speed line 34 to the operational side chamber (h1) of the second friction member (C2) and the third friction element (C3), and the remaining hydraulic pressure is controlled by the fifth solenoid valve (S5) and is used as control pressure by the control switch valve 44.

In addition, the control switch valve 44 controls the time in which hydraulic pressure is supplied to the third friction element (C3) and adjusts the control time of the second friction element (C2), which operates as a reactive force element in the second and fourth speeds.

The control switch valve 44 is realized through a right side first port, which receives control pressure from the timing control line 52 connected to the first speed line 34; a second port, which receives both control pressure of the first pressure control valve 18 passing through the 1-2 shift valve 36, and hydraulic pressure from the second third speed lines 28 and 30 of the shift control valve 26; and a third port, which selectively supplies hydraulic pressure received from the above ports to the fail-safe valve 50 and the third friction element (C3). The third port, receiving hydraulic pressure from the first speed line 34, is structured such that it is controlled by the fifth solenoid valve (S5).

The high-low pressure valve 46 is controlled by receiving hydraulic pressure during the "OFF" operation of the fifth solenoid valve (S5) from the timing control line 52, and is able to change line pressure by supplying this hydraulic pressure to the pressure regulator valve 8 in the third and fourth speed stages.

To perform the above, the high-low pressure valve 46 is provided with a first port, communicating with the timing control line 52; a second port, which receives third speed pressure by communicating with the third speed line 30; and a third port, supplying third speed pressure, received as in the above, to the pressure regulator valve 8.

The rear clutch release valve 48 is controlled by the fourth speed pressure of the shift control valve 26. The hydraulic pressure supplied from the second pressure control valve 20 in first, second, and third speeds is supplied to the first friction element (C1). When shifting from the third speed to the fourth speed, the rear clutch release valve 48 allows direct discharge of the hydraulic pressure supplied to the first friction element (C1). When shifting from the third speed to the fourth speed and from the third speed to the second speed, the hydraulic pressure supplied to the release side chamber (h2) of the second friction element (C2) and the fourth friction element (C4) passes through the shift valve 42 and the reverse first control line 54 and is discharged.

The above rear clutch release valve 48 is provided with a first port, which receives hydraulic pressure from the fourth speed line 32 and supplies this to the 2-3/4-3 shift valve 42; a second port, communicating with the second pressure control valve 20; a third port communicating with the reverse first control line 54 and two ports, one of which connects this port to the 2-3/4-3 shift valve 42; and a port, which supplies the hydraulic pressure supplied to the second pressure control valve 20 to the first friction element (C1).

The formation of the above two ports communicating with the reverse first control line 54 is done to communicate the 2-3/4-3 shift valve 42 with a branch line 58, independent from the reverse first control line 54, and for communicating a separate line, formed from the branch line 58, to a port of the reverse first control line 54. A check valve 60 is mounted between the branch line 58 and the reverse first control line 54. The check valve 60 is able to control the hydraulic pressure returning in this space.

The fail-safe valve 50, used for safety means, can maintain the third speed when the TCU is inoperative or when sticking occurs in the shift valves.

For this purpose, the fail-safe valve 50 includes first and second ports receiving hydraulic pressure from the control switch valve 44; a third port connected with the second speed line 28 of the shift control valve 48; a fourth port which receives part of the hydraulic pressure supplied to the first friction member (C1); a fifth port receiving part of the hydraulic pressure supplied to the release side chamber (h2) of the second friction element (C2) and to the fourth friction element (C4); and a sixth port, which supplies the hydraulic pressure supplied to the control switch valve 44 to the operational side chamber (h1) of the second friction element (C2).

A kick-down switch 62 is fixed to the operational side chamber (h1) of the second friction element (C2). The kick-down switch 62 turns off when hydraulic pressure is supplied to the operational side chamber (h1), and turns on when hydraulic pressure is supplied to the release side chamber (h2). A corresponding signal is transmitted to the TCU by the kick-down switch 62.

A sixth solenoid valve (S6), not yet described, controls the damper clutch valve 12 by either operating or terminating the operation of the damper clutch valve 12.

In the hydraulic control system of the present invention structured as described above and as shown in FIG. 1, hydraulic pressure discharged from the oil pump 4 in the neutral "N" range is maintained at a fixed level of pressure by the pressure regulator valve 8. After being reduced by passing through the reducing valve 14, the hydraulic pressure is supplied to the damper clutch valve 12 and to the first and second pressure control valves 18 and 20.

Here, the third and fourth solenoid valves (S3) and (S4), duty controlled by the TCU, are set to "OFF" states, and their pressure control valve spools are moved to the right (in FIG. 1), thereby maintaining a neutral state.

Figure 2:
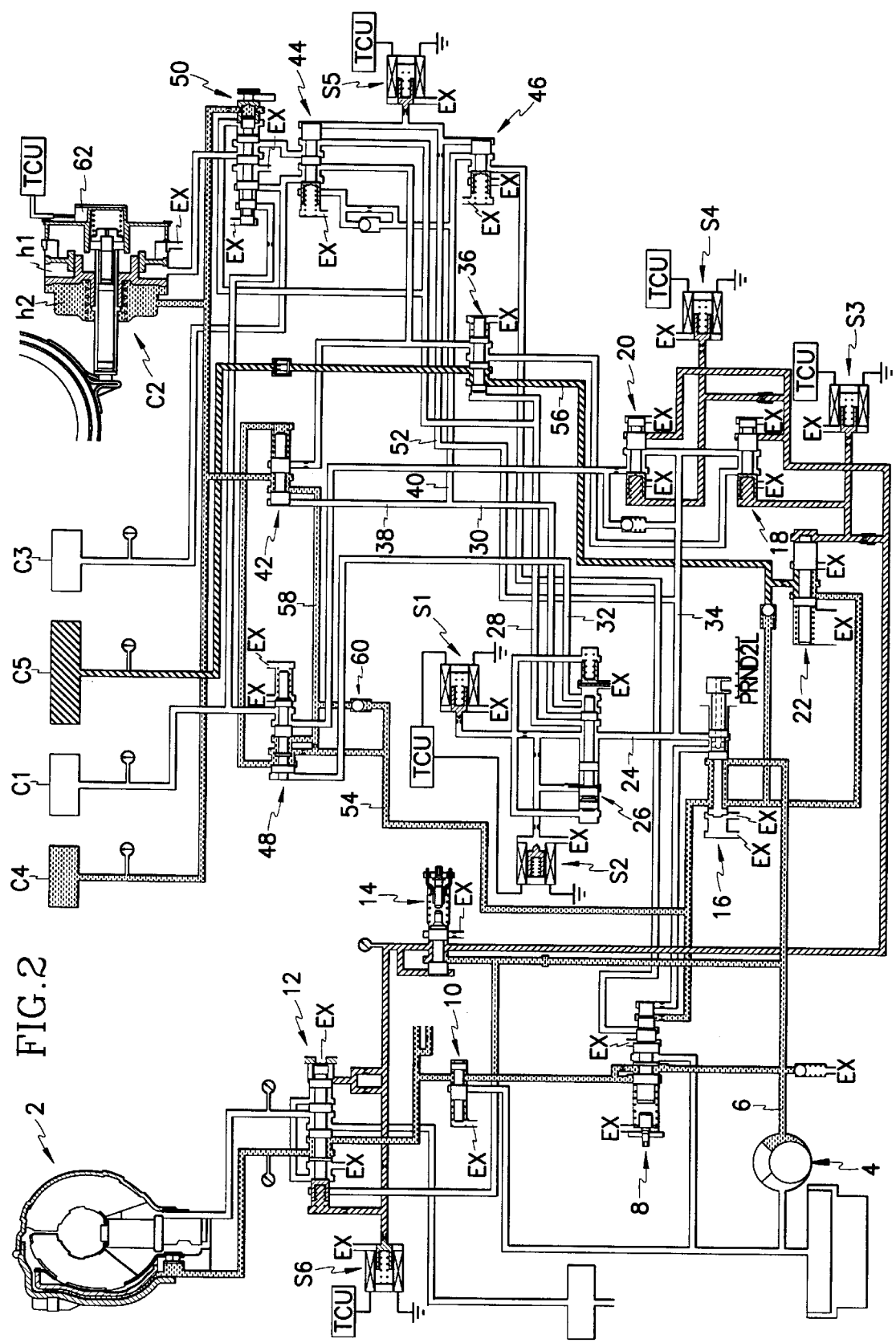
FIG. 2 is a view illustrating a hydraulic pressure flow state when manually shifting from the neutral "N" range to a reverse "R" range of the hydraulic control system of the present invention.

FIG. 2 is a view illustrating a hydraulic pressure flow state when shifting from a neutral "N" range to a reverse "R" range. Here, the hydraulic pressure from the manual valve 16 is directly supplied to the release side chamber (h2) of the second friction element (C2) and to the fourth friction element (C4) by passing through the reverse first control line 54, rear clutch release valve 48, and the 2-3/4-3 shift valve 42.

Also, part of the hydraulic pressure supplied to the manual valve 16 is controlled in the N-R control valve 22 by duty controlling the third solenoid valve (S3). Through the reverse second control line 56, the hydraulic pressure is supplied to the 1-2 shift valve 36, thereby moving a valve spool of the 1-2 shift valve 36 to the right. As a result, the hydraulic pressure is supplied to the fifth friction element (C5) which operates as a reactive force element when reversing.

After the hydraulic pressure is supplied through the lines as described above, the third solenoid valve (S3) is turned "OFF", and the hydraulic pressure that was supplied to the fifth friction element (C5) is changed from control pressure to drive pressure, and reverse shifting is completed.

Figure 3:
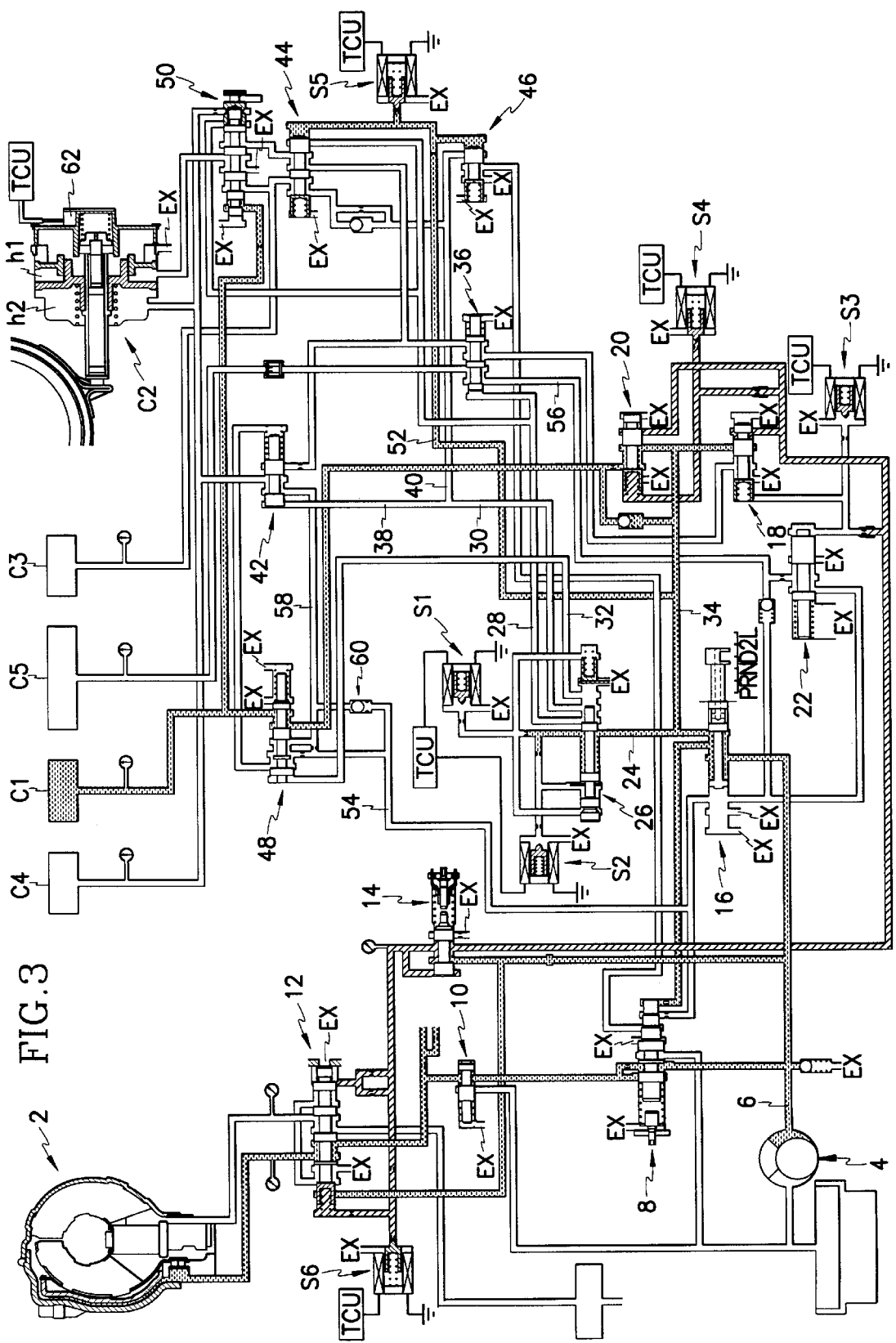
FIG. 3 is a view illustrating a hydraulic pressure flow state in a first speed of a drive "D" range of a hydraulic control system of the present invention.

When shifting the select lever from a neutral "N" state to a drive "D" state, as shown in FIG. 3, part of the hydraulic pressure supplied to the manual valve 16 is supplied to the shift control valve 26 and to the first and second pressure control valves 18 and 20.

At this time, the first and second solenoid valves (S1) and (S2) are set to "ON" states, and the ports of the shift control valve 26 are maintained in their initial states.

In the above state, the hydraulic pressure supplied to the first and second pressure control valves 18 and 20 is cut off in the first pressure control valve 18 by the "ON" setting of the third solenoid valve (S3). Also, the hydraulic pressure supplied to the second pressure control valve 20 is supplied to the first friction element (C1) (which operates as an input element when in the first speed) via the rear clutch release valve 48 by the "OFF" setting of the fourth solenoid valve (S4).

Figure 4:
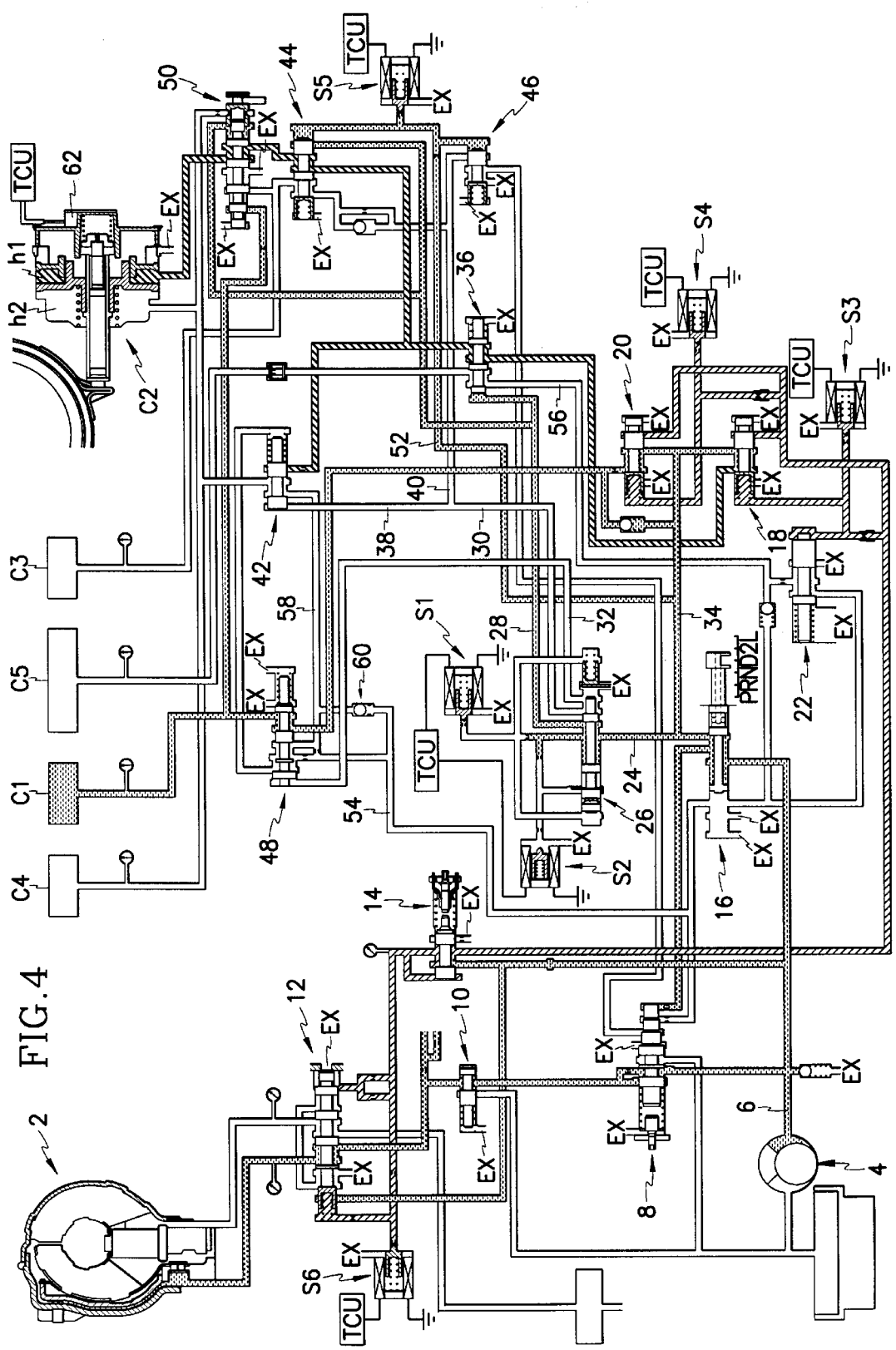
FIG. 4 is a view illustrating a hydraulic pressure flow state when up-shifting from the first speed to a second speed in the drive "D" range of a hydraulic control system of the present invention.

In this first speed state, if an opening degree of a throttle valve (not shown) is increased (to increase vehicle speed), the transmission shifts to the second speed. To accomplish this, as shown in FIG. 4, the TCU switches the first solenoid valve (S1) to an "OFF" state from an "ON" state, and the hydraulic pressure supplied to the shift control valve 26 is supplied to the second speed line 28.

When this occurs, this second speed hydraulic pressure is supplied to the left-side port of the 1-2 shift valve 36, thereby moving its valve spool to the right. At the same time, the pressure is supplied to and remains at the control switch valve 44 and the fail-safe valve 50.

Also, the hydraulic pressure supplied through the timing control line 52 is supplied to the control switch valve 44 and the high-low pressure valve 46 by the "OFF" setting of the fifth solenoid valve (S5), and their respective valve spools move to the left, as seen relative to the drawing.

Thereafter, by duty controlling of the third solenoid valve (S3), the control pressure in the first pressure control valve 18 is supplied to the operational side chamber (h1) of the second friction element (C2) via the control switch valve 44 and the fail-safe valve 50, after passing through the 1-2 shift valve 34.

Here, part of the hydraulic pressure passing through the 1-2 shift valve 36 is supplied to the 2-3/4-3 shift valve 42 and remains at this location.

Figure 5:
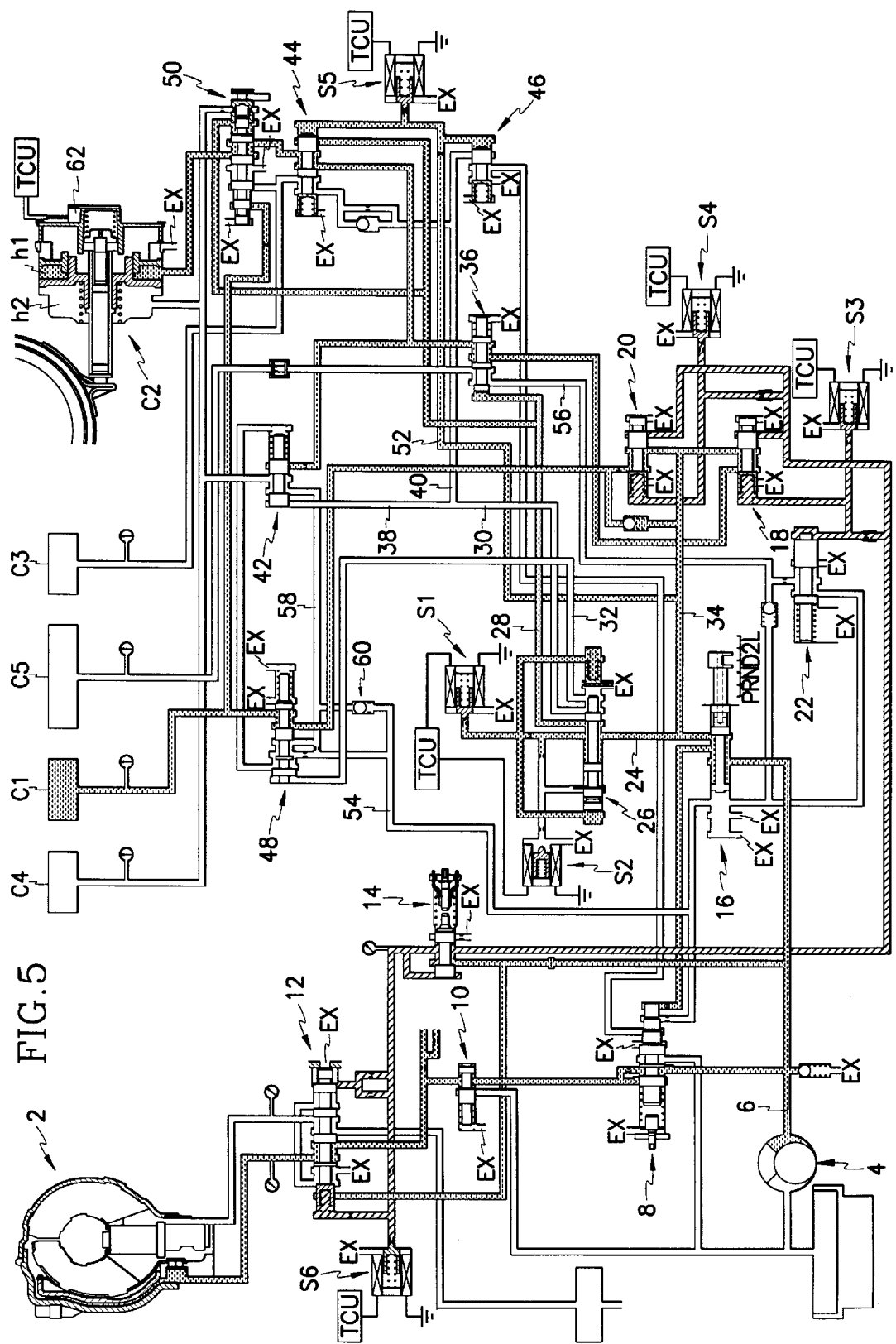
FIG. 5 is a view illustrating a hydraulic pressure flow state in the second speed of the drive "D" range of a hydraulic control system of the present invention.

When shifting is complete, as is shown in FIG. 5, if the third solenoid valve is switched to "OFF", the pressure supplied to the operational side chamber (h1) of the second friction element (C2) is converted to second speed line pressure from control pressure, and shifting to the second speed is completed.

Figure 6:
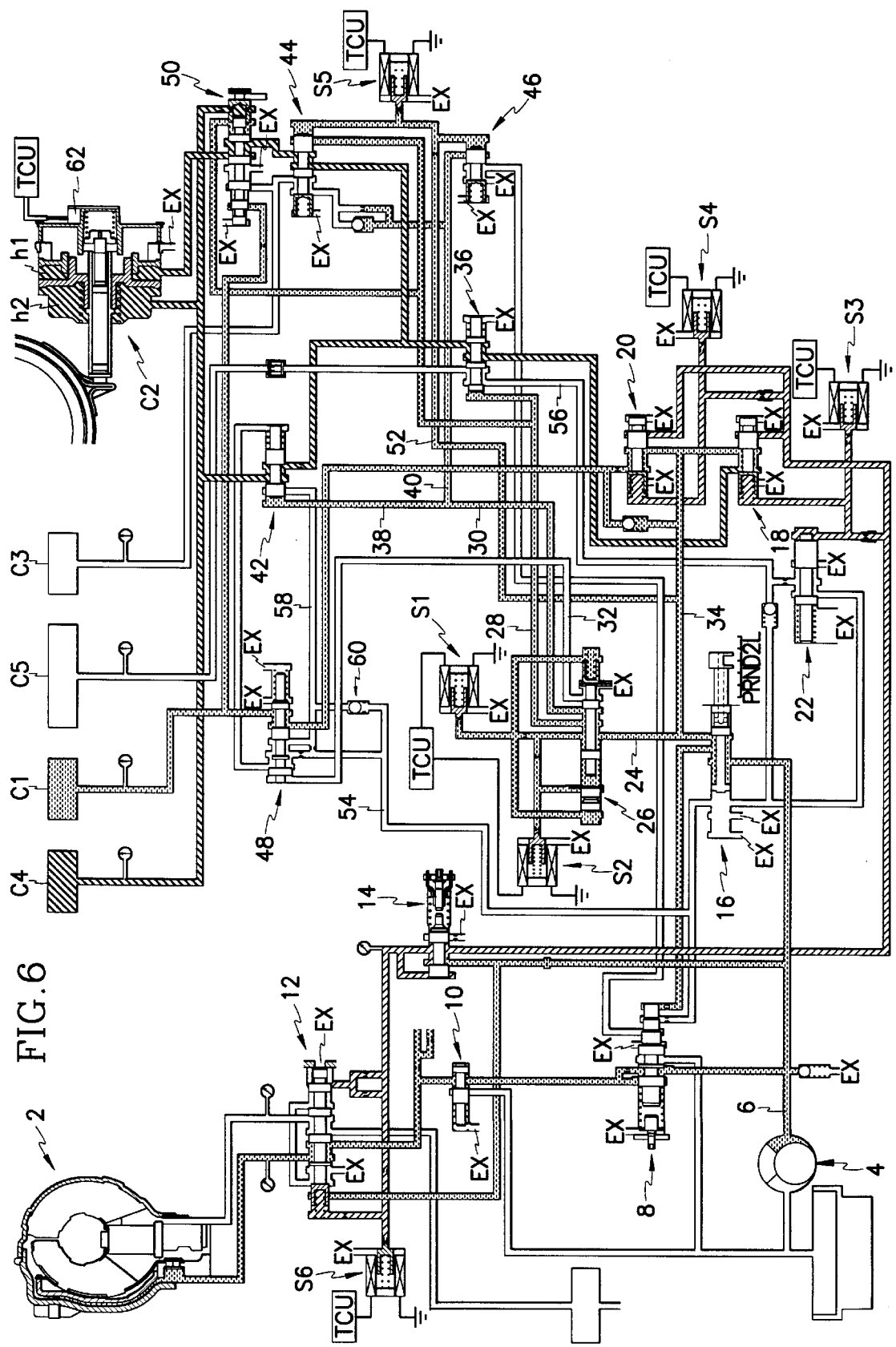
FIG. 6 is a view illustrating a hydraulic pressure flow state when up-shifting from the second speed to a third speed in the drive "D" range of a hydraulic control system of the present invention.

As shown in FIG. 6, if the throttle valve is further opened, while in second speed, the first and second solenoid valves (S1) and (S2) are turned "OFF".

Accordingly, hydraulic pressure is passed through the second speed line 28 and the third speed line 30. When this occurs, the hydraulic pressure of the third speed line 30 flows into the left side port of the 2-3/4-3 shift valve 42 and its spool moves to the right, as shown in the drawing. As a result, the pressure is supplied to the control switch valve 44 and the high-low pressure valve 46.

Therefore, when controlling second speed, the hydraulic pressure standing by in the 2-3/4-3 shift valve 42 is supplied to the release side chamber (h2) of the second friction element (C2), stopping the operation of the second friction element (C2) and, simultaneously, supplying control pressure to the fourth friction element (C4).

Also, as the valve spool of the control switch valve 44 is maintained in a leftward position (in the drawing) by the "OFF" setting of the fifth solenoid valve (S5), the hydraulic pressure supplied to the operational side chamber (h1) of the second friction element (C2) is converted into control pressure. At the same time, third speed pressure is supplied to the third friction element (C3).

Figure 7:
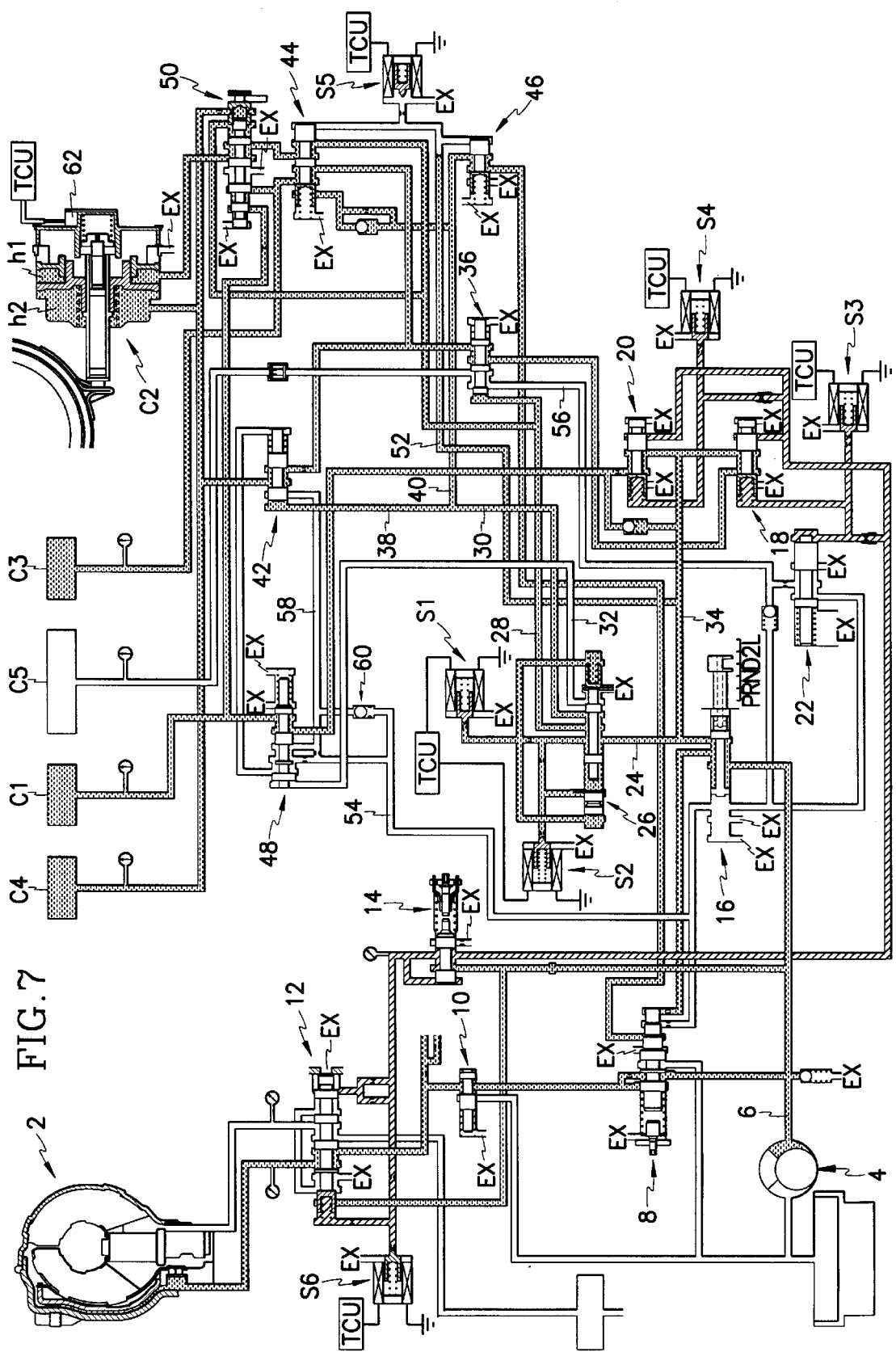
FIG. 7 is a view illustrating a hydraulic pressure flow state during line pressure change in the third speed of the drive "D" range of a hydraulic control system of the present invention.

In this state, as shown in FIG. 7, if the fifth solenoid valve (S5), which has been switched to an "OFF" state, is switched to an "ON" state at the end of shifting, valve spools of the control switch valve 44 and the high-low pressure valve 46 are moved rightward (in the drawing), and the pressure supplied to the operational side chamber (h1) of the second friction element (C2) by the operation of the fail-safe valve 50 is converted into second speed pressure. At the same time, the hydraulic pressure supplied to the third friction element (C3) is converted and supplied as first speed pressure, passing through the first pressure control valve 18, thereby completing shifting.

Line pressure is adjusted after passing through the high-low pressure valve 44 and after being supplied to the pressure regulator valve 8. That is, the change of line pressure in the third speed is not realized during shifting from the second speed to the third speed but, instead, it begins its change when the valve spool of the high-low pressure valve 46 moves to the right (in the drawing) after the fifth solenoid valve (S5) is switched "ON".

Also, the regulation of line pressure reduces possible drive damage to the oil pump 4 and improves fuel efficiency at high speeds.

Figure 8:
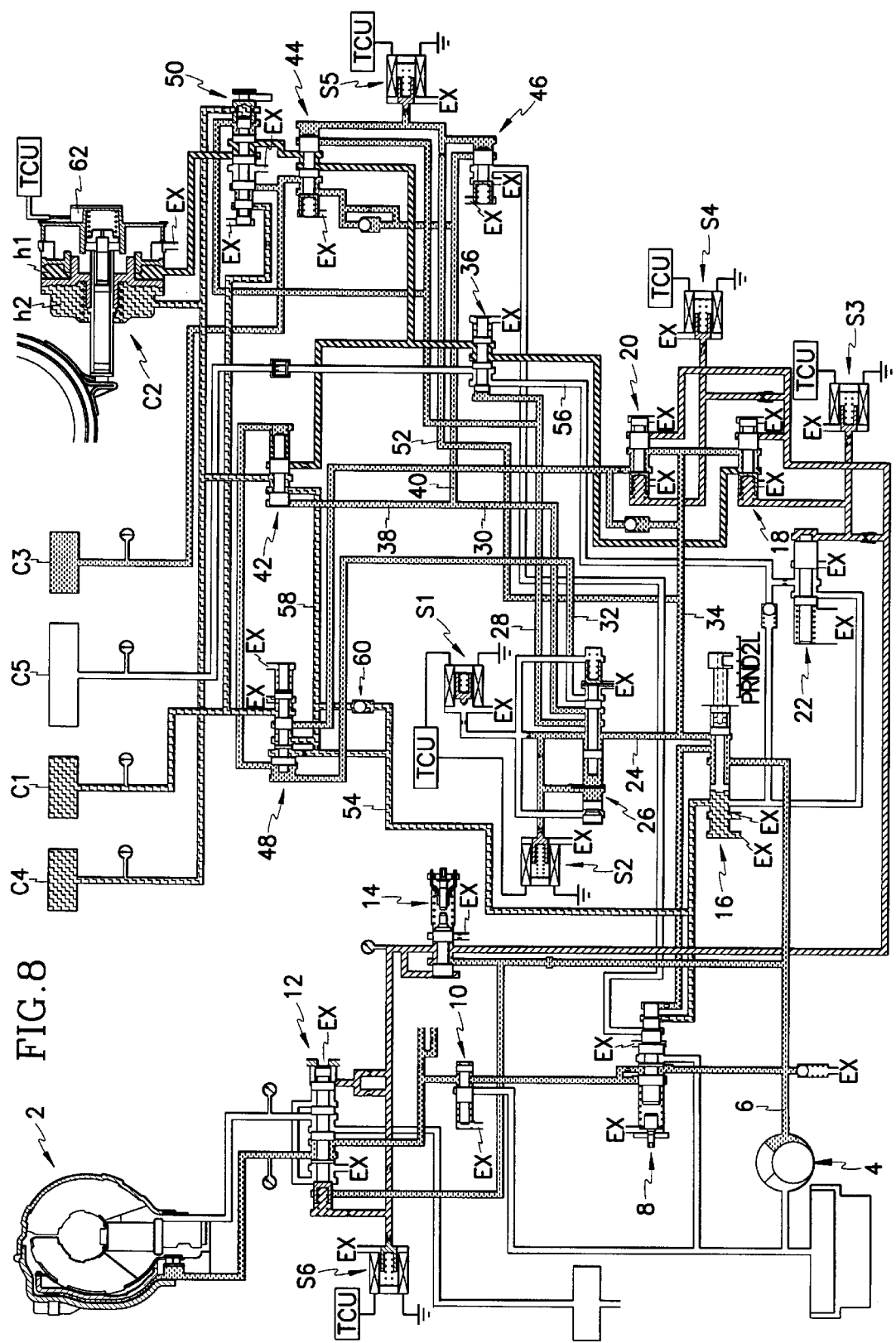
FIG. 8 is a view illustrating a hydraulic pressure flow state when up-shifting from the third speed to a fourth speed in the drive "D" range of a hydraulic control system of the present invention.

In the third speed control state, if the throttle valve is further opened, the TCU, as shown in FIG. 8, switches the first solenoid valve (S1) to an "ON" state and the second solenoid valve (S2) to an "OFF" state. This allows hydraulic pressure to flow into the second, third, and fourth speed lines 28, 30, and 32.

As a result, fourth speed line pressure controls the rear clutch release valve 48 and the 2-3/4-3 shift valve 42. By doing so, the valve spools of the rear clutch release valve 48 and the 2-3/4-3 shift valve 42 are moved respectively to the right and left (in the drawing).

When this happens, the operational pressure supplied to the first friction element (C1) is quickly exhausted through a discharge port (EX) of the rear clutch release valve 48. At the same time, the operational pressure supplied to the fourth friction element (C4) and the release side chamber (h2) of the second friction element (C2) is exhausted through the manual valve 16, via the 2-3/4-3 shift valve 42, the rear clutch release valve 48, and the reverse first control line 54.

Simultaneously, by the operation of the control switch valve 44 and the high-low pressure valve 46, (operated according to the "OFF" setting of the fifth solenoid valve), the hydraulic pressure supplied to the operational side chamber (h1) of the second friction element (C2) is changed into control pressure, hydraulic pressure supplied to the pressure regulator valve 8 is released, and line pressure control is discontinued.

Figure 9:
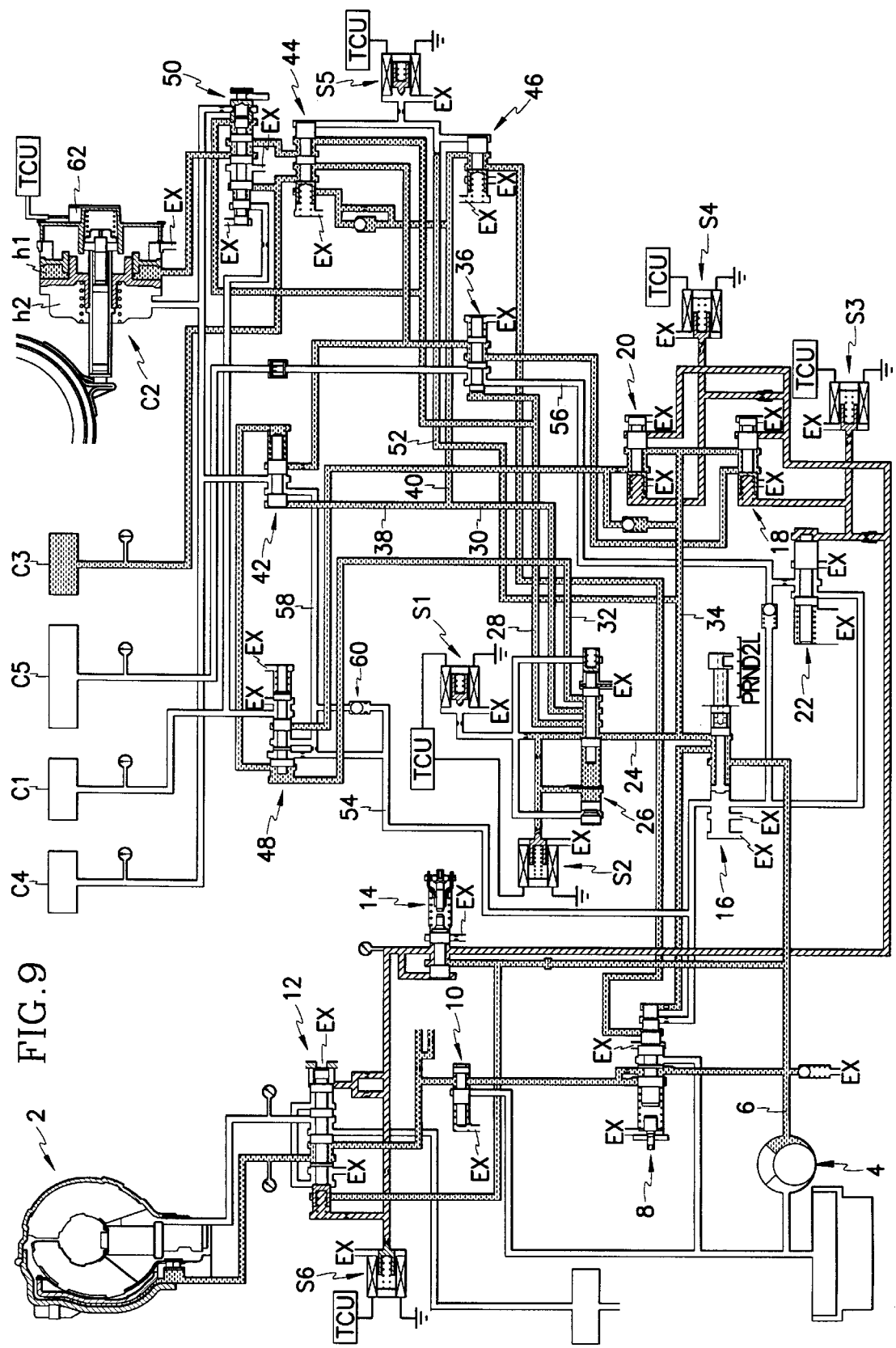
FIG. 9 is a view illustrating a hydraulic pressure flow state during line pressure change in the fourth speed of the drive "D" range of a hydraulic control system of the present invention.

After shift control has been realized as described above, as shown in FIG. 9, the fifth solenoid valve is switched to an "ON" state, which moves the valve spool of the control switch 44 to the right (in the drawing). This allows second speed pressure to be supplied to the operational side chamber (h1) of the second friction element (C2), and third speed pressure to be supplied to the pressure regulator valve 8 via the high-low pressure valve 46, realizing line pressure change and thereby completing fourth speed control.

Control conditions relating to down shifting will now be examined.

Figure 10:
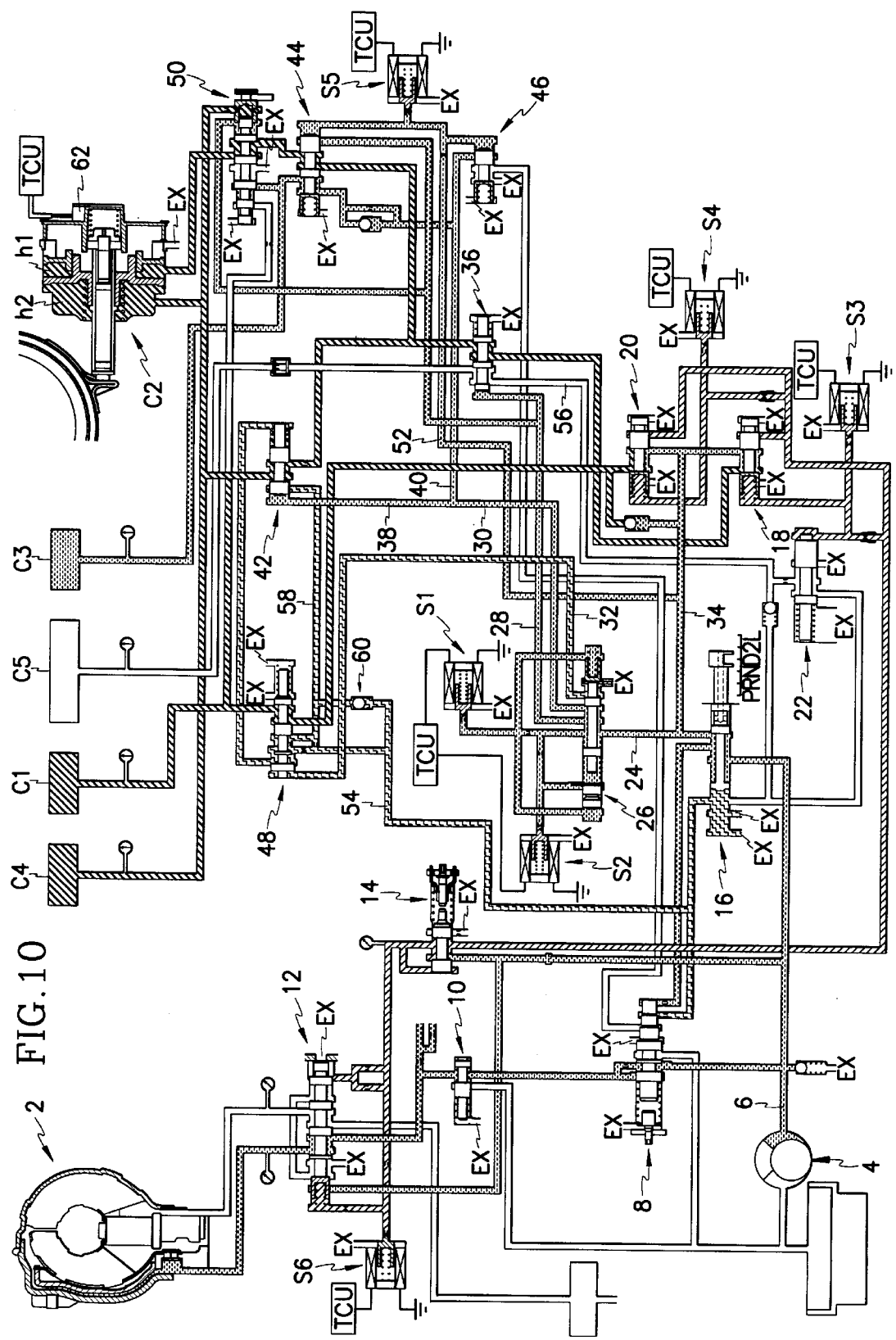
FIG. 10 is a view illustrating a hydraulic pressure flow state when down-shifting from the fourth speed to the third speed in the drive "D" range of a hydraulic control system of the present invention.

Referring first to FIG. 10, when down shifting from the fourth speed to the third speed, the first solenoid valve (S1), set to "ON" in the fourth speed, is switched to an "OFF" state, and the hydraulic pressure supplied to the fourth speed line 32 is discharged through the shift control valve 26, causing the valve spool of the 3-4 shift valve 42 to move to the right.

Also, by duty controlling the third and fourth solenoid valves (S3) and (S4), part of the hydraulic pressure, (controlled in the first pressure control valve 18 and supplied to the control switch valve 42 via the 1-2 shift valve 36), is supplied to the operational side chamber (h1) of the second friction element (C2) by the "OFF" setting of the fifth solenoid valve (S5). The remaining hydraulic pressure is supplied to the fourth friction element (C4) and the release side chamber (h2) of the second friction element (C2) via the 2-3/4-3 shift valve 42.

Simultaneously, the hydraulic pressure controlled by the second pressure control valve 20 is supplied as control pressure to the first friction element (C1) through the rear clutch release valve 48. That is, when down-shifting from fourth speed to third speed, severe shift shock does not develop because the operational pressure of the first friction element (C1) is supplied by duty controlling the fourth solenoid valve (S4). Thus, in the shifting process, the problem of temporarily moving into a neutral state is avoided.

Figure 11:
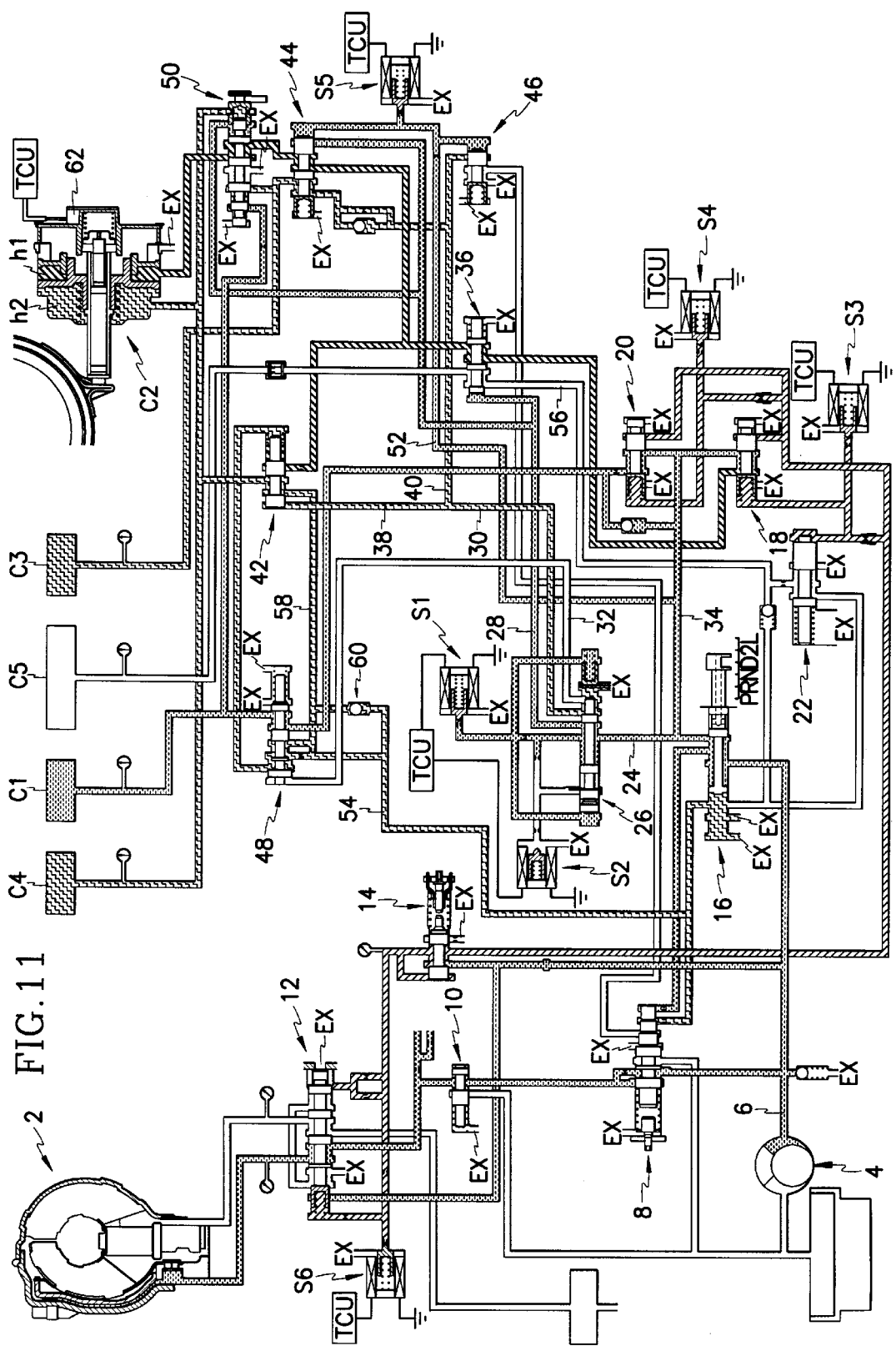
FIG. 11 is a view illustrating a hydraulic pressure flow state when down-shifting from the third speed to the second speed in the drive "D" range of a hydraulic control system of the present invention.

Referring to FIG. 11, when down shifting from third speed to second speed, second solenoid valve (S2), which is switched "ON" in the third speed, is switched to an "OFF" state. The hydraulic pressure supplied to the third friction element (C3) is therefore quickly discharged through the third speed line 30 and the shift control valve 26.

As a result, the valve spool of the 2-3/4-3 shift control valve 42 moves leftward (in the drawing), and the hydraulic pressure supplied to the release side chamber (h2) of the second friction element (C2) and the fourth friction element (C4) passes through the 2-3/4-3 shift valve 42, the rear clutch release valve 48, and the reverse first control line 54 and is discharged through the manual valve 16.

Further, after the hydraulic pressure supplied to the operational side chamber (h1) of the second friction element (C2) is changed to complete shifting by duty controlling of the third solenoid valve (S3) and the "OFF" setting of the fifth solenoid valve (S5), it is then changed to and supplied as first speed pressure by the "OFF" setting of the third solenoid valve (S3), completing the shift operation in a state shown in FIG. 5.

Figure 12:
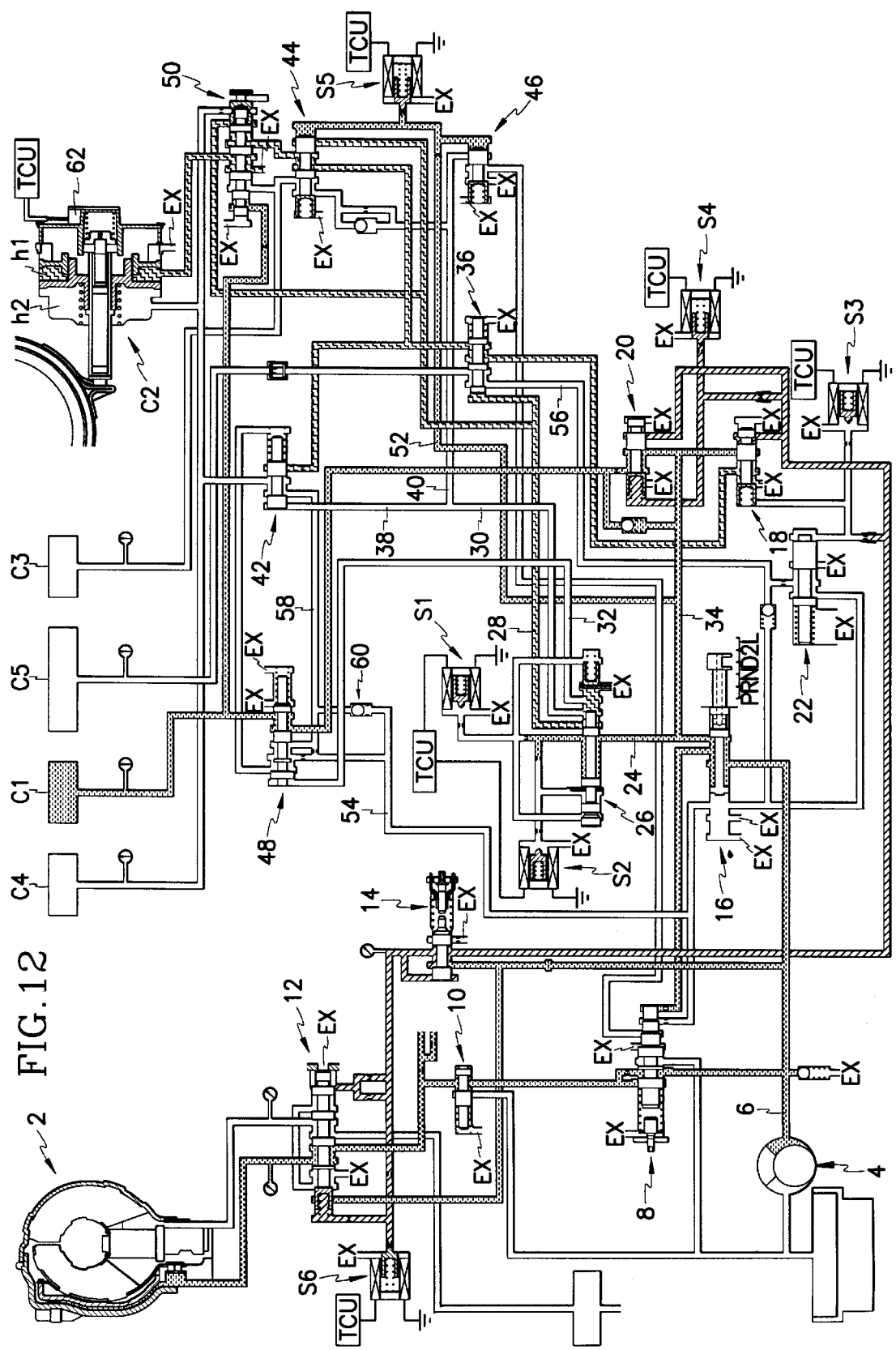
FIG. 12 is a view illustrating a hydraulic pressure flow state when down-shifting from the second speed to the first speed in the drive "D" range of a hydraulic control system of the present invention.

In FIG. 12, when down shifting from the second speed to the first speed, the first solenoid valve (S1) is maintained in an "OFF" state until the end of the shifting period, at which point it is switched to an "ON" state. Also, the third and fifth solenoid valves (S3) and (S5) remain in "OFF" states.

As a result of the above, the hydraulic pressure supplied to the second speed line 28 is quickly discharged through a discharge port (EX) of the shift control valve 26, and the hydraulic pressure supplied to the operational side chamber (h1) of the second friction element (C2) is discharged through the fail-safe valve 48, thereby completing the second speed to first speed shift operation.

Figure 13:
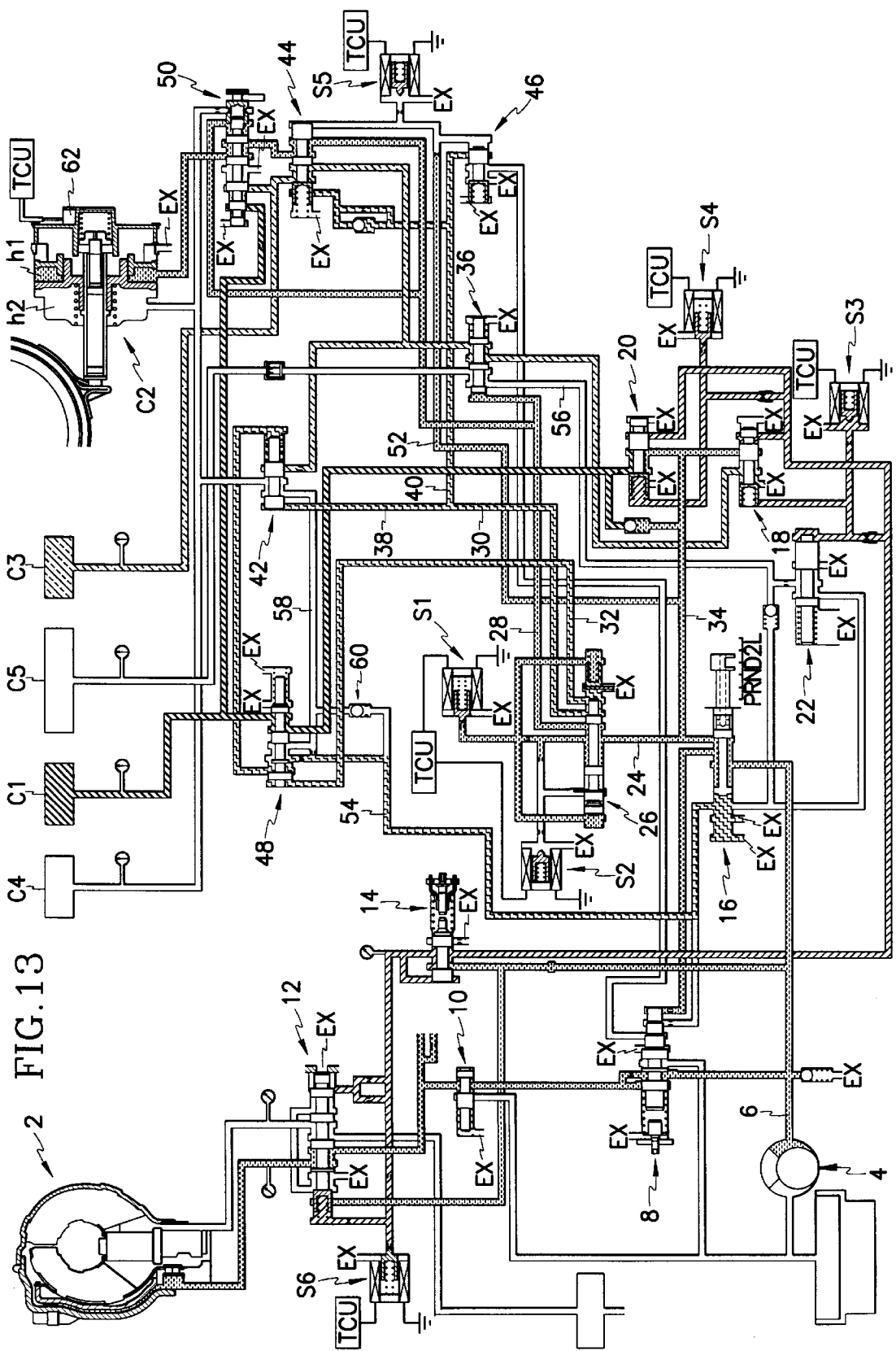
FIG. 13 is a view illustrating a hydraulic pressure flow state when down-shifting from the fourth speed to the second speed in the drive "D" range of a hydraulic control system of the present invention.

Referring to FIG. 13, when down shifting from the fourth speed to the second speed, in the fourth speed state, the third and fourth solenoid valves (S3) and (S4) are duty controlled, and the fifth solenoid valve (S5) is switched to "ON".

When this is done, hydraulic pressure supplied to the third and fourth speed lines 30 and 32 is discharged through the discharge port (EX) of the shift control valve 26, and the valve spools of the rear clutch release valve 48 and the 2-3/4-3 shift valve 42 are moved leftward (in the drawing).

Also, the third solenoid valve (S3) is duty controlled, and the hydraulic pressure supplied to the third friction element (C3) is discharged through a discharge port (EX) of the first pressure control valve 18. In addition, the control pressure controlled by the second pressure control valve 20 is supplied to the first friction element (C1) via the rear clutch release valve 48, thereby completing the shift operation.

Figure 14:
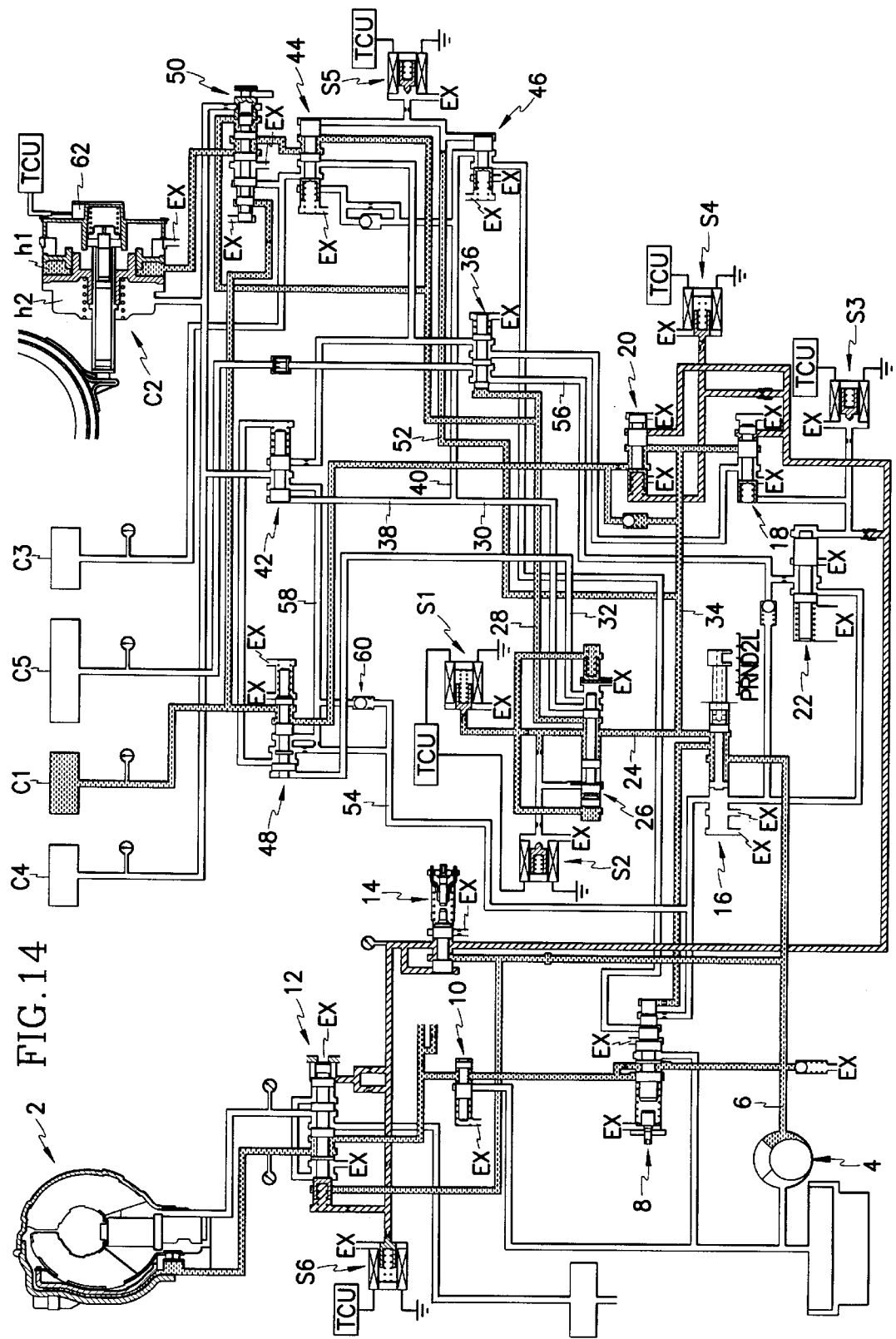
FIG. 14 is a view illustrating a hydraulic pressure flow state in a second speed after down-shifting from the fourth speed to the second speed in the drive "D" range of a hydraulic control system of the present invention.

In the above-described state and as shown in FIG. 14, the third solenoid valve (S3) is switched "ON" at the end of the shifting process, and the fourth solenoid valve (S4) is switched "OFF".

As a result, the hydraulic pressure supplied to the first friction element (C1) receives a supply of first speed pressure and follows the paths shown in FIG. 14.

The difference in the flow of hydraulic pressure after skip shifting from fourth speed to second speed, and first speed to second speed and third speed to second speed shifting is done to prevent a reduction in the operational pressure of the second friction element (C2) operational side chamber (h1).

In the hydraulic control system of the present invention, there is independent control of friction elements operating when shifting from fourth speed to second speed and from neutral to drive, so control is easily realized.

Also, there is the prevention in a reduction of operational pressure, which continually operates after skip shifting from fourth speed to second speed, to the operational side chamber of the second friction element, and the valve spool of the fail-safe valve is able to operate in first speed, resulting in the prevention of sticking.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A hydraulic control system for an automatic transmission including a plurality of friction elements associated with respective transmission speeds, the hydraulic control system comprising:

a hydraulic pressure source;

hydraulic pressure regulating means for regulating a hydraulic pressure from said hydraulic pressure source;

means for selecting a transmission mode;

means for automatically controlling shifting between a plurality of transmission speeds in a selected said transmission mode, said means for controlling shifting comprising means for distributing hydraulic pressure to and releasing hydraulic pressure from respective ones of the plurality of friction elements, whereby shifting between transmission speeds is performed, said means for distributing hydraulic pressure comprising:

a shift control valve selectively connected to said hydraulic pressure source depending on a selected transmission mode, said shift control valve being operatively connected to first and second solenoid valves and being constructed and arranged to change a hydraulic pressure flow path in accordance with inputs from said first and second solenoid valves, whereby hydraulic pressure is operatively provided to and released from respective ones of the plurality of friction elements, thereby providing control of transmission speed shifting; and first and second hydraulic pressure control valves selectively connected to said hydraulic pressure source depending a transmission mode selected by said means for selecting a transmission mode and being operatively connected to and controlled by third and fourth solenoid valves, respectively;

a 1-2 shift valve connected to said shift control valve, said first pressure control valve, and at least one of the friction elements other than the first friction element;

a rear clutch release valve connected to said shift control valve, said means for selecting a transmission mode, said second hydraulic pressure control valve, and said first friction element;

a 2-3/4-3 shift valve connected to said shift control valve, said 1-2 shift valve, said means for selecting a transmission mode, said rear clutch release valve, and said second and fourth friction elements;

a control switch valve, connected to said 1-2 shift valve, said shift control valve, said means for selecting a transmission mode, and said third friction element;

a high-low pressure valve connected to said hydraulic pressure regulating means, said shift control valve, said 2-3/4-3 shift valve, said means for selecting a transmission mode, said first and second hydraulic pressure control valves, and said control switch valve;

a rear clutch release valve connected to said 2-3/4-3 shift valve, said first friction element, said hydraulic pressure regulating means, said shift control valve, said second hydraulic pressure control valve, said means for selecting a transmission mode, and said hydraulic pressure regulating means; and a fail-safe valve connected to said control switch valve, said rear clutch valve, said shift control valve, said first, second, third, and fourth friction elements, and said 2-3/4-3 shift valve; and a hydraulic pressure controller.

2. The control system according to claim 1, wherein said hydraulic pressure source is an oil pump using oil as a hydraulic fluid.

3. The control system according to claim 2, wherein said hydraulic pressure control means comprises:

a hydraulic pressure regulator valve connected to said oil pump;

a torque convertor control valve connected to said hydraulic pressure regulator valve;

a damper clutch control valve connected to said torque convertor control valve and said oil pump; and a hydraulic pressure reducing valve connected to said oil pump and said damper clutch control valve.

4. The control system according to claim 1, wherein said means for selecting a transmission mode is a manually operated gearshift.

5. The control system according to claim 1, wherein said means for selecting a transmission mode selects a transmission mode from among a reverse mode, a neutral mode, and at least one drive mode.

6. The control system according to claim 1, wherein wherein said 2-3/4-3 shift valve is constructed and arranged to be supplied with hydraulic pressure from said 1-2 shift valve and said rear clutch release valve and provide the hydraulic pressure to said second and fourth friction elements.

7. The control system according to claim 6, wherein said 2-3/4-3 shift valve is constructed and arranged to simultaneously provide the hydraulic pressure to said second and fourth friction elements.

8. The control system according to claim 1, comprising a fifth solenoid valve controlling said control switch valve and said high-low pressure valve.

9. The control system according to claim 1, wherein said 1-2 shift valve includes:

a first port receiving hydraulic pressure from said shift control valve in a second, a third, and a fourth transmission speed;

a second port receiving hydraulic pressure from said first pressure control valve;

a third port selectively receiving hydraulic pressure from said means for selecting a transmission mode depending on a transmission mode selected thereby;

a fourth port receiving hydraulic pressure from said first pressure control valve by way of said 2-3/4-3 shift valve and said control switch valve; and a fifth port connected to said fifth friction element.

10. The control system according to claim 1, wherein said 2-3/4-3 shift valve includes:

a first port connected to said shift control valve;

a second port connected to said rear clutch release valve;

a third port connected with said 1-2 shift valve;

a fourth port connected to at least said rear clutch release valve; and a fifth port communicating with said second and fourth friction elements.

11. The control system according to claim 1, wherein said control switch valve includes:

a first port connected to said means for selecting a transmission mode;

a second port which receives both control pressure of the first pressure control valve passing through the 1-2 shift valve, and hydraulic pressure from the second third speed lines of the shift control valve; and a third port for selectively supplying hydraulic pressure received from said first and second ports to said fail-safe valve and the third friction element, said third port receiving hydraulic pressure from the first speed line is structured such that it is controlled by the fifth solenoid valve.

12. The control system according to claim 1, wherein said fail-safe valve includes a valve spool operated by the hydraulic pressure supplied to the first friction element.

13. The control system according to claim 1, wherein said high-low pressure valve includes:

a first port communicating with said means for selecting a transmission mode;

a second port communicating with said shift control valve; and a third port communicating with said pressure regulator valve.

14. The control system according to claim 13, wherein said high-low pressure valve further includes an exhaust port.

15. The control system according to claim 1, wherein said rear clutch release valve includes:

- a first port receiving hydraulic pressure from said shift control valve and supplying it to said 2-3/4-3 shift valve;
- a second port communicating with said second hydrualic pressure control valve;
- a third and fourth ports communicating with said pressure regulator valve and said means for selecting a transmission mode; and
- a fifth port communicating with said first friction element.

16. The hydraulic control system according to claim 1, wherein said fail-safe valve includes:

- first and second ports receiving hydraulic pressure from said control switch valve;
- a third port communicating with said shift control valve;
- a fourth port communicating with said first friction member;
- a fifth port communicating with said second friction element and said fourth friction element; and
- a sixth port communicating with said second friction element.

17. The control system according to claim 16, wherein said fail safe valve includes an exhaust port.

* * * * *